(12) United States Patent
Berger et al.

(10) Patent No.: US 8,343,009 B2
(45) Date of Patent: Jan. 1, 2013

(54) POWER-SPLIT WIND POWER GENERATOR GEARBOX

(75) Inventors: Gunter Berger, Castrop-Rauxel (DE); Gerhard Bauer, Witten (DE)

(73) Assignee: Bosch Rexroth AG (DE)

( * ) Notice: Subject to any disclaimer, the term of this patent is extended or adjusted under 35 U.S.C. 154(b) by 699 days.

(21) Appl. No.: 12/516,864

(22) PCT Filed: Dec. 4, 2007

(86) PCT No.: PCT/EP2007/063300
§ 371 (c)(1),
(2), (4) Date: Dec. 2, 2009

(87) PCT Pub. No.: WO2008/068260
PCT Pub. Date: Jun. 12, 2008

(65) Prior Publication Data
US 2010/0105512 A1 Apr. 29, 2010

(30) Foreign Application Priority Data
Dec. 4, 2006 (DE) .......................... 10 2006 057 055

(51) Int. Cl.
*F16H 57/08* (2006.01)
(52) U.S. Cl. ......................... 475/337; 475/347
(58) Field of Classification Search .................. 475/220, 475/221, 229–331, 337, 339, 344, 346, 347
See application file for complete search history.

(56) References Cited

U.S. PATENT DOCUMENTS

| | | | |
|---|---|---|---|
| 1,494,503 A * | 5/1924 | Rackham ...................... | 475/312 |
| 3,854,349 A * | 12/1974 | Michling ...................... | 475/337 |
| 5,423,726 A | 6/1995 | Kota et al. | |
| 6,223,616 B1 * | 5/2001 | Sheridan ...................... | 74/468 |
| 6,420,808 B1 * | 7/2002 | Hosle .......................... | 310/83 |
| 6,607,464 B1 | 8/2003 | Bauer et al. | |
| 6,790,156 B2 * | 9/2004 | Hosle ........................... | 475/331 |
| 7,282,808 B2 * | 10/2007 | Shibata et al. ................. | 290/55 |
| 2002/0049108 A1 | 4/2002 | Hosle | |

(Continued)

FOREIGN PATENT DOCUMENTS

DE 100 43 593 3/2002

(Continued)

OTHER PUBLICATIONS

English translated International Preliminary Examination Report, dated Dec. 4, 2007, Application No. PCT/EP2007/063300.

*Primary Examiner* — Justin Holmes
(74) *Attorney, Agent, or Firm* — Jack Schwartz and Associates, PLLC

(57) ABSTRACT

A power-distributed wind turbine transmission for transmitting a torque generated by a rotor hub to an output pinion rotating with increased speed compared to the former to drive an electric generator, wherein at least two parallel-connected planetary stages are provided for power-distributed speed increase internal to the transmission, wherein further coupling of the rotor hub is carried out by means of a connection ring element on the input side of the transmission, which is rotatably supported by a large roller bearing at a fixed transmission housing, and which transmits the force flow in a power-distributed manner to the hollow gears of the parallel-connected planetary stages by means of cardan-like decoupling means formed thereon.

14 Claims, 2 Drawing Sheets

U.S. PATENT DOCUMENTS

2011/0068583 A1* 3/2011 Burkart .................. 290/55

FOREIGN PATENT DOCUMENTS

| EP | 1 243 791 | 9/2002 |
|---|---|---|
| EP | 1240443 | 12/2006 |
| WO | WO/96/11338 | 4/1996 |
| WO | WO/02/14690 | 2/2002 |
| WO | WO/03/031812 | 4/2003 |
| WO | WO/2006/000214 | 1/2006 |

* cited by examiner

POWER-SPLIT WIND POWER GENERATOR GEARBOX

FIELD OF THE INVENTION

The present invention relates to a power-distributed wind turbine transmission for transmitting a torque generated by a rotor hub to a power-output shaft rotating at relatively higher speed compared to the former, for driving an electric generator, wherein at least two parallel-connected planetary stages are provided for power-distributed transmission within the transmission.

BACKGROUND OF THE INVENTION

In a wind turbine generator system of the type of interest here, in the power flow between a rotor converting the wind energy into a rotary motion and a generator transforming the rotary motion into electric energy, a transmission with a speed increase is arranged. Since the modules of the wind turbine generator system are mostly placed within a nacelle at the top of a tower, a transmission which is as compact as possible and has the lowest possible mass is desirable. This requirement is in conflict, however, with the tendency towards ever larger wind turbine generator systems having greater power, which require more powerful transmissions, among other things. To limit their mass, the power-distributed wind turbine transmissions of interest here have been used as of late.

EP 1 240 443 A1 discloses a generic power-distributed wind turbine transmission. It is composed essentially of a symmetrically-constructed planetary transmission on the input side, consisting of at least two equally dimensioned parallel-connected power-distributed planetary stages. To combine the moment flow distributed by the planetary stages on the output side, a load-compensating differential transmission stage is connected downstream, which can be formed either as a passive type of differential or as an active type of differential in the form of a differential planetary transmission. As an alternative, the active differential can also be a differential spur-gear pair, which is axially flexibly supported and has opposing helical toothing.

In all embodiments, a normal drive shaft is provided on the input side of this power-distributed wind turbine transmission, to which either the rotor of the wind turbine generator system can be directly connected, or a distance-covering rotor shaft is connectable by means of a shaft-hub connection. On the inside of the transmission, the drive shaft is coupled to the common planet carrier of the parallel-connected planetary stages. Limiting this construction to a normal shaft as a drive shaft on the transmission input side leads to the problem, however—should the rotor be attached directly to the wind turbine transmission—that the relatively large diameter of a rotor hub must be connected to the small diameter of the drive shaft. The power flow coming from the rotor hub would have to be directed from the outside to the inside onto the drive shaft. The rotor of a wind turbine generator system does not only produce a pure torque, however. Due to its own weight forces and due to force and moment variations on the rotor blade caused by the wind and the like, the drive shaft is exposed, in particular, to disturbing bending moments and transverse forces. Apart from extreme bearing loads at the drive shaft, they can also lead to disturbances in tooth mesh in the transmission and therefore to higher wear and tear.

WO 02/14690 discloses a technical approach which tries to solve the above explained problems by arranging the rotor hub with the given large diameter directly on a planet carrier of a planetary stage on the transmission input side, dispensing with a normal drive shaft, wherein the planet carrier has been radially expanded toward the outside to a corresponding diameter. The planet carrier radially expanded beyond the diameter of the hollow gear of the planetary stage on the input side also establishes the connection to a large roller bearing, via which the rotor is supported at the fixed transmission housing or another supporting construction. This design achieves the advantage that disturbing load forces, such as bending moments and transverse forces, are directly fed to the large roller bearing via the rotor hub, and by these means into the fixed supporting structure, whereas the torque—stripped thereof—is fed from the rotor hub into the planet carrier and from there into the first planetary stage. What is driven is therefore the planet carrier, while the hollow gear is coupled with the supporting structure in a non-rotatable fashion. The output of the planetary stage is the sun gear. Due to the design chosen of the two planetary stages arranged in series, there is no power distribution within the two planetary stages, but each individual stage is dimensioned for the entire power supplied by the rotor. This is in contravention to a diameter reduction of the hollow gear and therefore indirectly of the outer diameter of the transmission, because the principle of advantageously occurring power distribution on the input side in coupled planetary transmissions is not used.

While in this technical approach, due to its construction, the disturbing bending moments and transverse forces are weakened due to feeding the power onto a large diameter, they are not, however, entirely eliminated so that the disturbing deformation of the components situated in the power flow also affects the toothing between the planetary gears and the hollow and sun gears via the planet carrier.

SUMMARY OF THE INVENTION

It is the object of the present invention to create a power-distributed wind turbine transmission of the initially described type which is suitable for direct coupling to a rotor and which is distinguished by a minimal structural size.

The object is solved on the basis of a power-distributed wind turbine transmission according to the preamble of claim 1 in combination with its characterizing features.

The subsequent dependent claims define advantageous embodiments of the invention.

The invention includes the technical teaching that coupling of the rotor hub is carried out by means of a connecting ring element on the input side of the transmission, which is rotatably supported at a fixed transmission housing by means of a large roller bearing, by arranging the inner race of the large roller bearing at the connecting ring element, while the outer race of the large roller bearing is arranged at the fixed transmission housing.

The advantage of the approach according to the present invention lies in that a hard wearing wind turbine generator system can be realized with a rotor directly coupled to the wind turbine transmission to achieve a higher class of power output. This design principle with an integrated large roller bearing of the size of the rotor hub diameter allows a compact design.

Moreover, in terms of functional integration, the connecting ring element, apart from its function with respect to supporting the rotor, can also distribute the torque generated by the rotor hub to connected hollow gears of the parallel-connected planetary stages, which initiates power distribution.

According to an embodiment for improving on the invention, it is provided that the connection of at least one of the hollow gears at the connecting ring element is achieved by means of flexible connecting means to compensate bending and displacement due to stresses on the transmission from the side of the rotor. By these special connecting means on the transmission input side, disturbing external forces and moments are separated from the torque to be transmitted and transferred to the transmission housing.

Preferably, the flexible connecting means are formed as a cardan-type decoupling unit. By connecting the two hollow gears of the parallel-connected planetary stages preferably by means of a double-cardan connection, roller bearing deformations at the large roller bearing due to the disturbing external forces and moments cannot reach the toothing of the two planetary stages, which can therefore transmit the effective driving torque with minimal wear and tear and with optimal tooth engagement.

The cardan-type decoupling unit can be formed by an inner toothing of the connecting ring element and a corresponding hollow gear outer toothing, wherein these toothings cooperate in the manner of a spiral-tooth coupling. This spiral-tooth coupling tolerates bending and displacement due to the stresses on the transmission from the side of the rotor. The double-cardan connection of the hollow gears created hereby is designed to transfer solely the torque to be transmitted on the input side of the transmission. It is also conceivable, however, to achieve the effect of a cardan-type decoupling by other structural elements, such as flexible disc-like elements or resilient sleeve springs and the like.

To ensure advantageous force flow, the outer diameter of the rotor hub should approximately correspond to the outer diameter of the connecting ring element. Under this condition, the interface between the two components can also be formed in the manner of a flange connection so that the rotor can be screwed by means of the rotor hub to the connecting ring element forming the input shaft of the transmission.

Also preferably, the large roller bearing is formed as a moment bearing; a double tapered roller bearing is particularly suitable for this purpose. Instead of a single large roller bearing it is also conceivable, of course, to arrange a plurality of individual bearings in series. In the case of a single large roller bearing, the inner race of the bearing is preferably provided for attachment to the connecting ring element. To achieve this, the large roller bearing is shifted onto the connecting element via the inner race. The outer race of the large roller bearing is attached to the fixed transmission housing. The attachment of the outer race on the transmission housing is preferably by means of a flange-type screw connection so that the large roller bearing can be simply replaced if necessary. With this chosen manner of connection with a fixed outer race and a rotating inner race, the circumferential load arising in the large roller bearing is applied to the entire material volume of the inner race and not only a part thereof, which is in contrast to the initially mentioned state of the art, since the conventionally fixed inner race has a punctual load applied to it.

According to the present invention, the torque flow on the transmission input side is directed, for the purpose of power distribution, via at least two, preferably exactly two, planetary stages, by driving the two hollow gears of the two planetary stages, wherein the two planetary stages are coupled with the planet carrier of the input side planetary stage via the sun gear shaft of the output side planetary stage. The planet carrier of the one planetary stage is driven by the sun gear of the other planetary stage. The planet carrier of the second planetary stage is fixed, however. To enable the sun gear arranged on the output side of the second planetary stage to transmit the torque to the planet carrier of the first planetary stage, it is suggested to form the latter as a hollow shaft, wherein a sun gear shaft extends from the sun gear of the first planetary stage and extends through this hollow shaft. A compact structure is thus achieved overall.

To achieve a structural size which is as compact as possible, it is suggested to arrange the hollow gear of the one planetary stage within the annular space created by the connecting element, whereas the hollow gear of the other planetary stage is arranged downstream of the large roller bearing in the axial direction.

According to an embodiment further improving upon the invention it is provided that the central sun gear shaft has a spur gear stage connected on the output side, which is a further step-up stage. The electric generator is connected at an output pinion, the axis of which is offset with respect to the central sun shaft.

BRIEF DESCRIPTION OF THE DRAWINGS

Further embodiments improving upon the invention will be illustrated in more detail together with the description of a preferred exemplary embodiment with reference to the drawing.

DETAILED DESCRIPTION OF THE INVENTION

Figure 1:
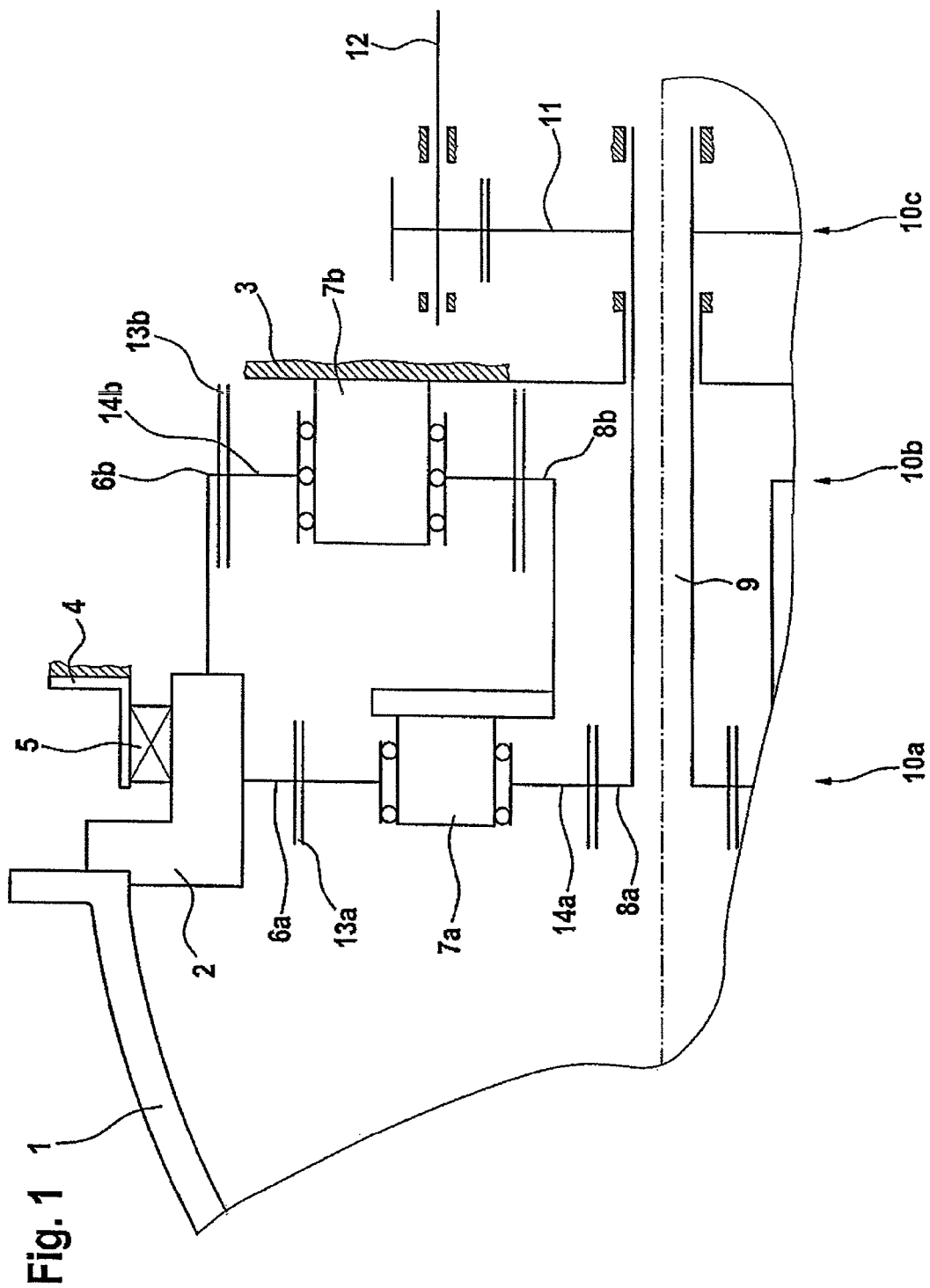
FIGS. 1 and 2 show a schematic part sectional view of a power-distributed wind turbine transmission.

According to FIG. 1, a rotor hub 1 of a rotor (not shown in any more detail) is mounted on a connection ring element 2 on the transmission input side. The outer diameter of rotor hub 1 here approximately corresponds to the outer diameter of connection ring element 2 which, in turn, approximately corresponds to the outer diameter, or the outer dimensions, of a transmission housing 3 accommodating the transmission components. Transmission housing 3 is fixedly connected with a support structure (not shown in any more detail) of the nacelle at the top of a tower of a wind turbine generator system.

The connection ring element 2 on the input side of the transmission is rotatably supported at the fixed transmission housing 3 via a large roller bearing 5 by means of its outer race. The inner race of the large roller bearing 5, by contrast, receives the connection ring element 2.

The large roller bearing 5 fulfills the function of a moment bearing, wherein the input-side torque is transmitted to hollow gears 6a and 6b of two parallel-connected power-distributed planetary stages 10a and 10b, respectively, via the connection ring element 2 used herein. Besides the hollow gear 6a of first planetary stage 10a, the planet carrier of the first planetary stage 10a is also driven—via the second planetary stage 10b—so that an output-side sun gear 8a transmits the force flow. This transmission is via a central sun gear shaft 9 extending from sun gear 8a.

Planet gears 14a on planet carrier 7a of the first planetary stage 10a are driven by an output-side inner gear 8b of the second planetary stage 10b. In the context of the second planetary stage 10b, the planet carrier 7b comprising the planetary gears 14b is fixedly arranged within housing 3. Sun gear 8b of second planetary stage 10b is formed as a hollow shaft so that sun gear shaft 9 can extend coaxially therethrough. The central sun gear shaft 9 has an output-side spur gear stage 10c connected downstream of it. Spur gear stage 10c consists of an output gear 11 fixedly connected to sun gear shaft 9, which is in mesh with an output pinion 12, the axis of which is offset with respect to sun shaft 9. Output pinion 12 is on the input side of the electric generator (not shown in any more detail) for generating electric alternating current.

To decouple the above described transmission parts from disturbing bending moments introduced by the rotor and the like, cardan-like decoupling means are provided between connection ring element 2 and the two hollow gears 6a and 6b driven by it, of the parallel-connected planetary stages 10a and 10b.

Figure 2:
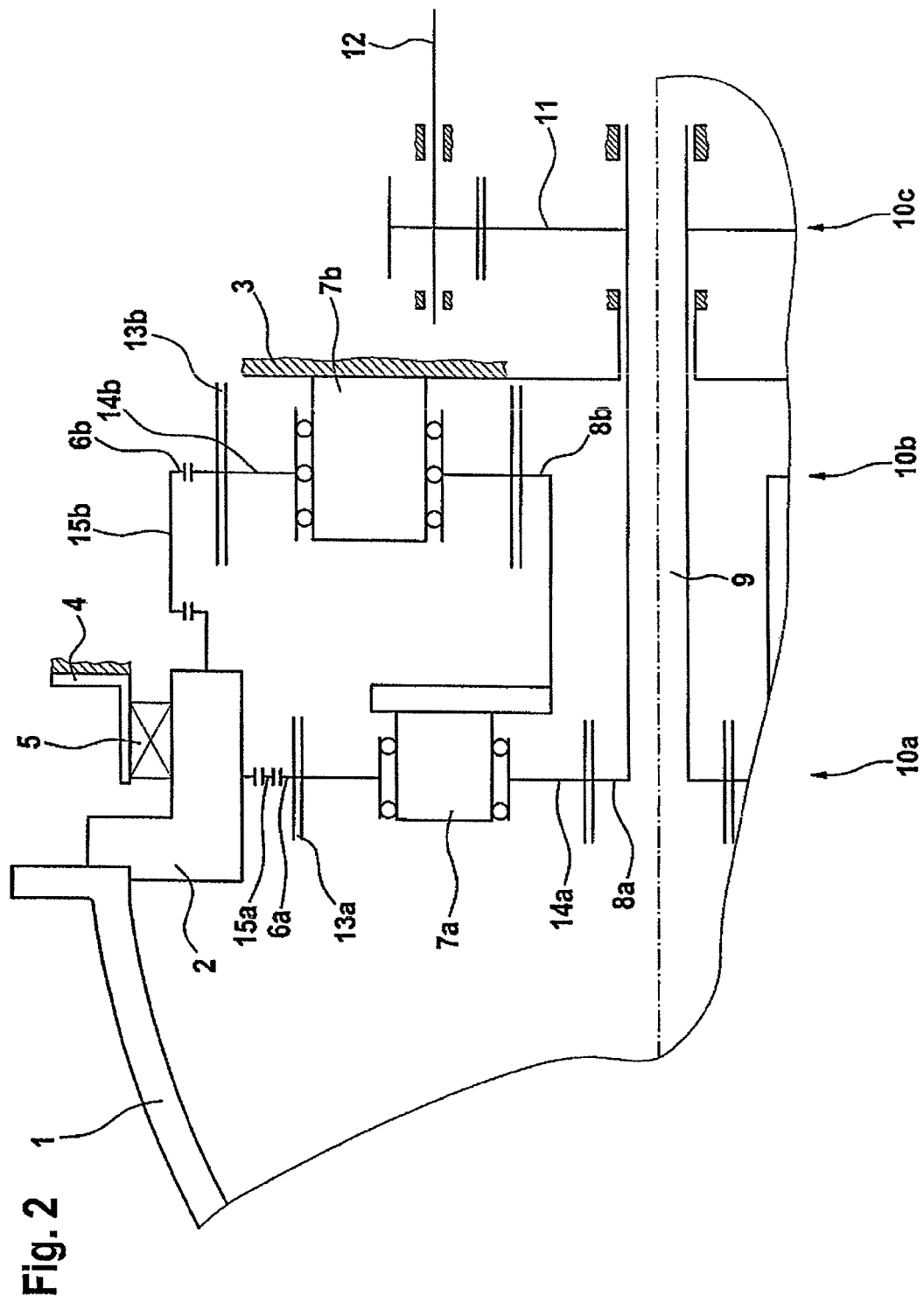

According to FIG. 2, the cardan-like decoupling means are formed in the manner of a spiral-tooth coupling 15a, 15b. For this purpose, the connection ring element 2 has two inner toothings 13a and 13b axially spaced with respect to each other, which are in mesh with corresponding outer toothings on hollow gears 6a and 6b, respectively. The tooth geometry herein corresponds to a well-known spiral-tooth coupling. Bending and displacement due to stresses on the transmission from the side of the rotor are compensated. Otherwise the present embodiment corresponds to the above-described embodiment.

The invention is not limited to the above-described preferred exemplary embodiments. Modifications are also conceivable, which are comprised by the scope of protection of the appended claims. It is also possible, for example, to form the cardan-type decoupling means for neutralizing the stresses on the transmission from the side of the rotor in another manner, for example, by means of disc-like elements or the like. Further, it is also possible to realize the power distribution achieved by parallel-connected planetary stages by a different suitable connection of the transmission elements. It should also be noted that the downstream spur gear stage can also be omitted, as necessary.

LIST OF REFERENCE NUMERALS

1 rotor hub
2 connection ring element
3 transmission housing
4 supporting construction
5 large roller bearing
6 hollow gear
7 planet carrier
8 sun gear
9 sun gear shaft
10a first planetary stage
10b second planetary stage
10c spur gear stage
11 output gear
12 output pinion
13 inner toothing
14 planetary gear
15 spiral-tooth coupling

The invention claimed is:

1. A power-distributed wind turbine transmission for transmitting a torque generated by a rotor hub to an output pinion with increased speed compared to the former to drive an electric generator, wherein at least two planetary stages are provided for power-distributed speed increase internal to a transmission,
 a connection ring element is provided on the transmission input side with the rotor hub being mounted thereto, the connection ring element is rotatably supported by a large roller bearing with respect to a fixed transmission housing by mounting an inner race of the large roller bearing on the connection ring element, whereas the outer race of the large roller bearing is mounted on the fixed transmission housing, wherein the connection ring element distributes the torque generated by the rotor hub between connected hollow gears of the at least two parallel-connected planetary stages.

2. The power-distributed wind turbine transmission according to claim 1, wherein the outer diameter of the rotor hub corresponds to the outer diameter of the connection ring element.

3. The power-distributed wind turbine transmission according to claim 1, wherein the connection ring element can be screwed to the rotor hub via a flange connection.

4. The power-distributed wind turbine transmission according to claim 1, wherein the large roller bearing is formed in the manner of a moment bearing.

5. The power-distributed wind turbine transmission according to claim 1, wherein the one hollow gear is at least largely arranged within the annular space formed by the connection ring element, whereas the other hollow gear is downstream of the large roller bearing in the axial direction.

6. The power-distributed wind turbine transmission according to claim 1, wherein a planet carrier, also driven besides the hollow gear of a first planetary stage of the at least two planetary stages, transmits the force flow to an output side sun gear.

7. The power-distributed wind turbine transmission according to claim 6, the output-side sun gear of the first planetary stage transmits the power flow to a central sun gear shaft, which extends toward the output side of the transmission housing.

8. The power-distributed wind turbine transmission according to claim 7, wherein the central sun gear shaft has an output-side spur gear stage connected downstream of it, having an output pinion with an axis offset with respect to the central sun gear shaft for driving the electric generator.

9. The power-distributed wind turbine transmission according to claim 1, wherein a planet carrier of the second planetary stage is fixedly arranged, wherein an output-side sun gear drives the planet carrier of the first planetary stage.

10. The power-distributed wind turbine transmission according to claim 9, wherein the sun gear of the second planetary stage is formed as a hollow shaft coaxially arranged with respect to the sun gear shaft, extending therethrough, of the first planetary stage.

11. The power-distributed wind turbine transmission according to claim 1, wherein the connection of at least one of said hollow gears on the connection ring element is by means of flexible connection means to compensate bending and displacement due to stresses on the transmission from the side of the rotor.

12. The power-distributed wind turbine transmission according to claim 11, wherein the flexible connection means are formed in the manner of a cardan-type decoupling unit.

13. The power-distributed wind turbine transmission according to claim 12, wherein the cardan-type decoupling unit is formed by engagement in the manner of a spiral-tooth coupling of at least one inner toothing on the connection ring element with corresponding outer toothings on the hollow gears.

14. The power-distributed wind turbine transmission according to claim 13, wherein the large roller bearing formed as a moment bearing is a double tapered roller bearing.

* * * * *